(12) United States Patent  
Watanabe

(10) Patent No.: US 10,705,502 B2
(45) Date of Patent: Jul. 7, 2020

(54) NUMERICAL CONTROLLER PERFORMING OSCILLATION CUTTING CORRECTING SPINDLE TRACKING ERROR

(71) Applicant: FANUC CORPORATION, Minamitsuru-gun, Yamanashi (JP)

(72) Inventor: Toshihiro Watanabe, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 64 days.

(21) Appl. No.: 16/105,168

(22) Filed: Aug. 20, 2018

(65) Prior Publication Data

US 2019/0064764 A1 Feb. 28, 2019

(30) Foreign Application Priority Data

Aug. 22, 2017 (JP) ................................. 2017-159547

(51) Int. Cl.
*G05B 19/00* (2006.01)
*G05B 19/19* (2006.01)

(52) U.S. Cl.
CPC .... *G05B 19/19* (2013.01); *G05B 2219/45044* (2013.01)

(58) Field of Classification Search
CPC .......... G05B 19/19; G05B 2219/45044; G05B 2219/49384; G05B 2219/49055; G05B 19/18; B23Q 15/013
See application file for complete search history.

(56) References Cited

U.S. PATENT DOCUMENTS 4,873,793 A * 10/1989 Asano .................. G05B 19/184
                                                         451/5
5,777,294 A * 7/1998 Sugahara ............... B23K 26/08
                                                      219/121.67

(Continued)

FOREIGN PATENT DOCUMENTS

EP            265607 A1 *  8/1987
JP         06063845 A  *  3/1994

(Continued)

OTHER PUBLICATIONS

"Modulated Tool-Path Chip Breaking for Depleted Uranium Machining Operations", Barkman et al, Y-12 National Security Complex, US Dept. of Energy, Apr. 15, 2010 (2010).*

(Continued)

*Primary Examiner* — Michael D Masinick
(74) *Attorney, Agent, or Firm* — RatnerPrestia

(57) ABSTRACT

A numerical controller includes a position instruction generating unit configured to generate the position instruction; an oscillation instruction generating unit configured to generate the oscillation instruction; a position speed control unit configured to add the position instruction and the oscillation instruction to generate a synthesized instruction; and a current control unit configured to control movement of a tool or rotation of a spindle. The oscillation instruction generating unit includes a tracking error calculating unit configured to obtain and calculate an actual angle and an ideal angle of the spindle, and a frequency recalculating unit configured to recalculate the oscillation frequency or a rotational speed of the spindle based on the actual angle and the ideal angle. The current control unit controls the movement of the tool or the rotation of the spindle according to the recalculated oscillation frequency or rotational speed of the spindle.

2 Claims, 6 Drawing Sheets

(56) References Cited

U.S. PATENT DOCUMENTS

| | | | |
|---|---|---|---|
| 10,509,387 B2* | 12/2019 | Yamamoto | G05B 19/182 |
| 2013/0063724 A1* | 3/2013 | Tovey | G01N 21/253 |
| | | | 356/399 |
| 2014/0364993 A1* | 12/2014 | Matsushita | G05B 19/404 |
| | | | 700/193 |
| 2016/0011579 A1 | 1/2016 | Watanabe et al. | |
| 2016/0266567 A1 | 9/2016 | Watanabe et al. | |
| 2017/0075337 A1* | 3/2017 | Kameta | G05B 19/35 |
| 2017/0285608 A1* | 10/2017 | Sonoda | G05B 19/402 |
| 2017/0329302 A1* | 11/2017 | Sonoda | G05B 19/31 |
| 2018/0067466 A1* | 3/2018 | Sonoda | G05B 19/29 |
| 2018/0257192 A1 | 9/2018 | Nakaya et al. | |
| 2018/0281139 A1* | 10/2018 | Yamamoto | G05B 13/0265 |
| 2018/0297163 A1* | 10/2018 | Sonoda | G05B 19/402 |
| 2018/0297164 A1* | 10/2018 | Sonoda | B23Q 15/14 |
| 2018/0299857 A1* | 10/2018 | Oho | G05B 19/25 |
| 2018/0335765 A1* | 11/2018 | Tezuka | G05B 19/404 |
| 2019/0107820 A1* | 4/2019 | Yasuda | G05B 19/182 |

FOREIGN PATENT DOCUMENTS

| | | | |
|---|---|---|---|
| JP | 2017-056515 A | 3/2017 | |
| WO | 2014125569 A1 | 8/2014 | |
| WO | 2015162739 A1 | 10/2015 | |
| WO | 2016146116 A1 | 9/2016 | |
| WO | 2017051745 A1 | 3/2017 | |

OTHER PUBLICATIONS

Japanese Notice of Reasons for Refusal for Japanese Application No. 2017-159547, dated Sep. 3, 2019 with translation, 6 pages.

* cited by examiner

NUMERICAL CONTROLLER PERFORMING OSCILLATION CUTTING CORRECTING SPINDLE TRACKING ERROR

CROSS-REFERENCE TO RELATED APPLICATION

This application is a new U.S. Patent Application that claims benefit of Japanese Patent Application No. 2017-159547, filed Aug. 22, 2017, the disclosure of this application is being incorporated herein by reference in its entirety for all purposes.

BACKGROUND OF THE INVENTION

Field of the Invention

The present invention relates to a numerical controller and, more particularly, relates to a numerical controller that can perform oscillation cutting while maintaining chip shredding capability.

Description of the Related Art

A machining method for oscillating a tool in a cutting direction and shredding chips is referred to as oscillation cutting.
A conventional numerical controller performs the oscillation cutting by superimposing the following oscillation instruction on a machining instruction.

Oscillation instruction=$(K \times F/2) \times \sin(2\pi \times S/60 \times I \times t)$ In the above equation, $K \times F/2$ will be referred to as an oscillation amplitude, and $2\pi \times S/60 \times I$ will be referred to as an oscillation frequency. In addition, F represents feed per revolution [mm/rev], S represents a spindle rotational speed [$min^{-1}$], t represents a time [sec], K represents an oscillation amplitude multiplying factor, and I represents an oscillation frequency multiplying factor (the number of times of oscillation per rotation).

When an oscillation instruction (sine wave) is added to a machining instruction, a tool continues machining while repeating going back and forth in a feeding direction. In this case, when a tool path of first rotation and a tool path of second rotation overlap, and machining ends in failure, chips are shredded. FIG. 1 is a view illustrating a tool path in a case of the frequency multiplying factor I=4.5 (4.5 times of oscillations per rotation of spindle) and the amplitude multiplying factor K=1.05.

Focusing upon a tool position, the tool path of second rotation overlaps the tool path of the first rotation 4.5 times per rotation (indicated by a broken line circle in FIG. 1). Hence, in this example, chips are shredded 4.5 times during the second rotation.

According to Japanese Patent Application Laid-Open No. 2017-056515 A, a numerical controller adds an oscillation instruction to a machining instruction to which such an oscillation frequency and an oscillation amplitude have been set to generate a shift of half a cycle every time a workpiece rotates once, and performs oscillation cutting, and consequently can make tool paths overlap and shred chips.

However, even when oscillation cutting is performed as disclosed in Japanese Patent Application Laid-Open No. 2017-056515 A, if a tracking error occurs between spindle rotation and an oscillating operation (frequency), chips cannot be shredded well. The tracking error occurs when, for example, a spindle rotational speed fluctuates. FIG. 2 illustrates an example of a tracking error caused when a spindle rotational speed gradually increases. FIG. 2 illustrates an actual tool path and an ideal tool path (a tool path assumed when the spindle rotational speed is constant). It is assumed that, if the spindle rotational speed is constant, and the technique disclosed in Japanese Patent Application Laid-Open No. 2017-056515 A is used, a tool path of first rotation and a tool path of second rotation overlap as indicated by a broken line in FIG. 2, and the chips are shredded at an overlapping portion. However, when an oscillating operation continues at a previous frequency while the spindle rotational speed gradually increases, the oscillating operation causes relative delay, the tool path of the first rotation and the tool path of the second rotation do not overlap as indicated by a solid line in FIG. 2, and the chips are not shredded as a result.

SUMMARY OF THE INVENTION

The present invention has been made to solve the above problem. An object of the present invention is to provide a numerical controller that, even when a tracking error occurs between spindle rotation and an oscillating operation, can perform oscillation cutting while maintaining chip shredding capability.

A numerical controller according to one embodiment of the present invention is a numerical controller configured to perform oscillation cutting by superimposing an oscillation instruction on a position instruction, the oscillation instruction including specifying an oscillation frequency and an oscillation amplitude, and includes: a position instruction generating unit configured to generate the position instruction; an oscillation instruction generating unit configured to generate the oscillation instruction; a position speed control unit configured to add the position instruction and the oscillation instruction to generate a synthesized instruction; and a current control unit configured to control movement of a tool or rotation of a spindle, and the oscillation instruction generating unit includes a tracking error calculating unit configured to obtain and calculate an actual angle and an ideal angle of the spindle, and a frequency recalculating unit configured to recalculate the oscillation frequency or a rotational speed of the spindle based on the actual angle and the ideal angle, and the current control unit controls the movement of the tool or the rotation of the spindle according to the recalculated oscillation frequency or rotational speed of the spindle.

In the numerical controller according to one embodiment of the present invention, the oscillation instruction generating unit further includes an amplitude recalculating unit configured to recalculate the oscillation amplitude such that tool paths overlap, and the current control unit further controls the movement of the tool according to the recalculated oscillation amplitude.

The present invention can provide the numerical controller that, even when a tracking error occurs between spindle rotation and an oscillating operation, can perform oscillation cutting while maintaining chip shredding capability.

BRIEF DESCRIPTION OF THE DRAWINGS

Aforementioned and other objects and characteristics of the present invention will be made more apparent from description of the following embodiment in view of the accompanying drawings. Of these drawings.

DETAILED DESCRIPTION OF THE PREFERRED EMBODIMENTS

Embodiments of the present invention will be described below with reference to the drawings below.

Figure 1:
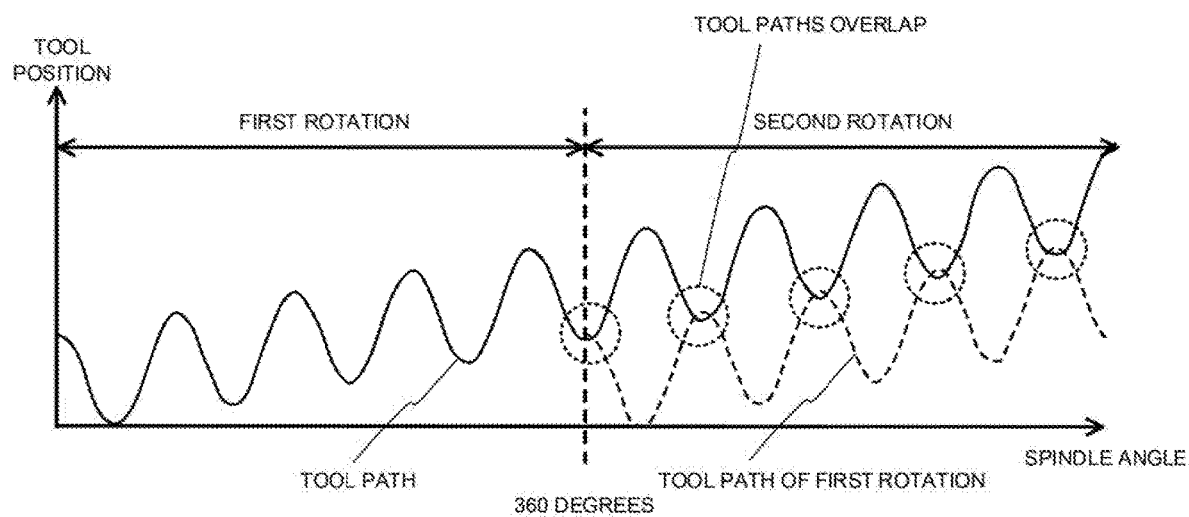
FIG. 1 is a view for explaining a principal of conventional oscillation cutting.
Figure 2:
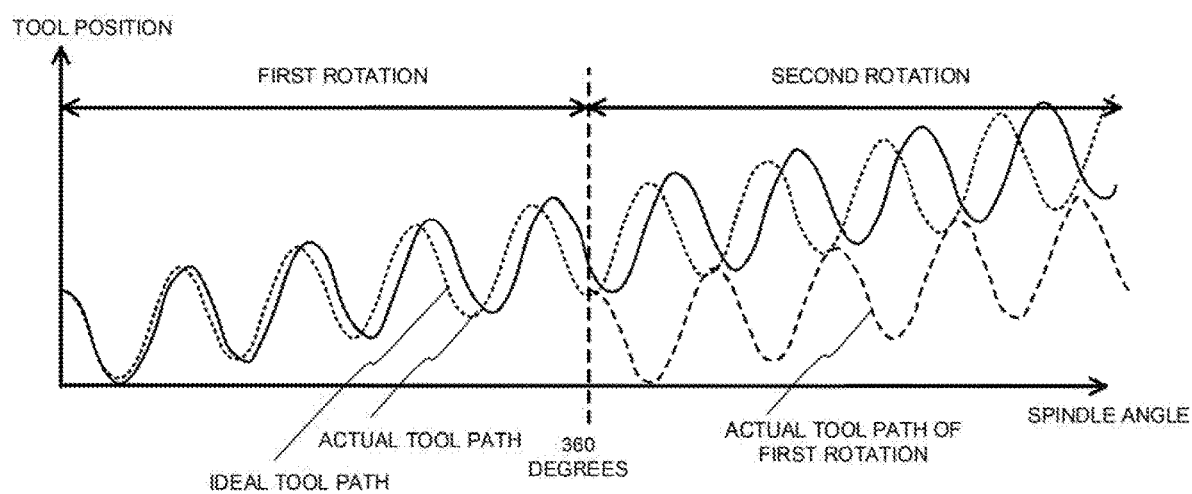
FIG. 2 is a view for explaining a problem caused by a tracking error of the conventional oscillation cutting.
Figure 3:
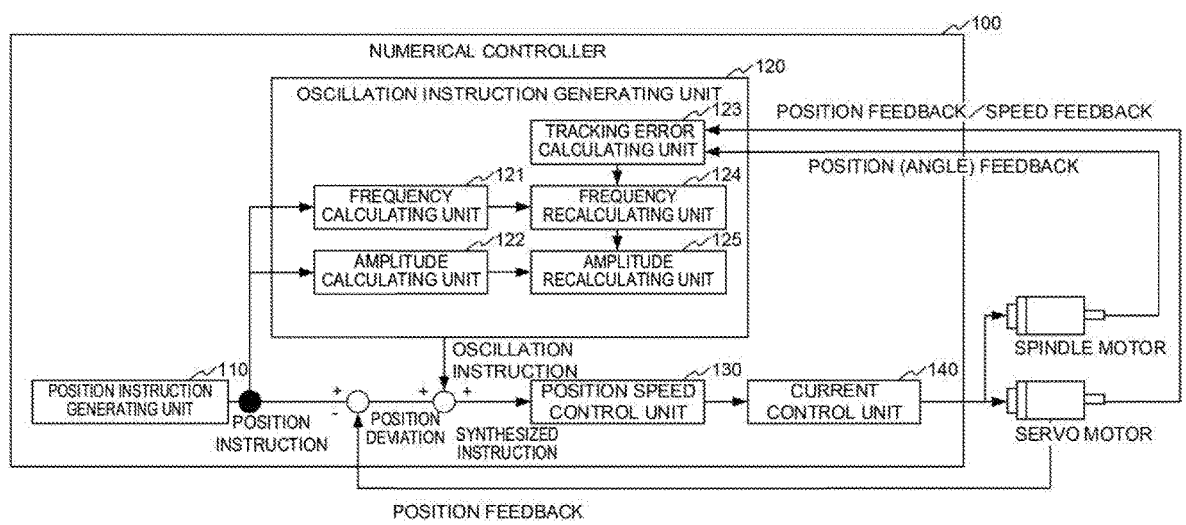
FIG. 3 is a block diagram for explaining a configuration of a numerical controller.

FIG. 3 is a block diagram for explaining a functional aspect of a numerical controller 100 according to an embodiment of the present invention. The numerical controller 100 includes a position instruction generating unit 110 that generates a position instruction, i.e., a movement instruction of a tool according to a machining program, an oscillation instruction generating unit 120 that generates an oscillation instruction; a position speed control unit 130 that adds the position instruction and the oscillation instruction to generate a synthesized instruction; and a current control unit 140 that controls a current to drive a spindle motor or a servo motor according to the synthesized instruction.

A conventional current control unit typically controls only a servo motor that moves a tool position. However, the current control unit 140 according to the present embodiment controls a spindle motor that rotates a spindle. Furthermore, a conventional numerical controller receives a position feedback from the servo motor, and corrects a position deviation. However, according to the present embodiment, too, it is possible to correct a position deviation likewise.

The oscillation instruction generating unit 120 includes a frequency calculating unit 121 that calculates an appropriate oscillation frequency to perform oscillation cutting, an amplitude calculating unit 122 that calculates an oscillation amplitude likewise, a tracking error calculating unit 123 that calculates a tracking error based on feedbacks from a spindle motor and a servo motor, a frequency recalculating unit 124 that corrects a frequency according to the tracking error, and an amplitude recalculating unit 125 that corrects an amplitude according to the tracking error. The frequency recalculating unit 124 and the amplitude recalculating unit 125 correct the frequency and the amplitude such that tool paths overlap even when the tracking error occurs, so that chips continue to be shredded.

Figure 4:
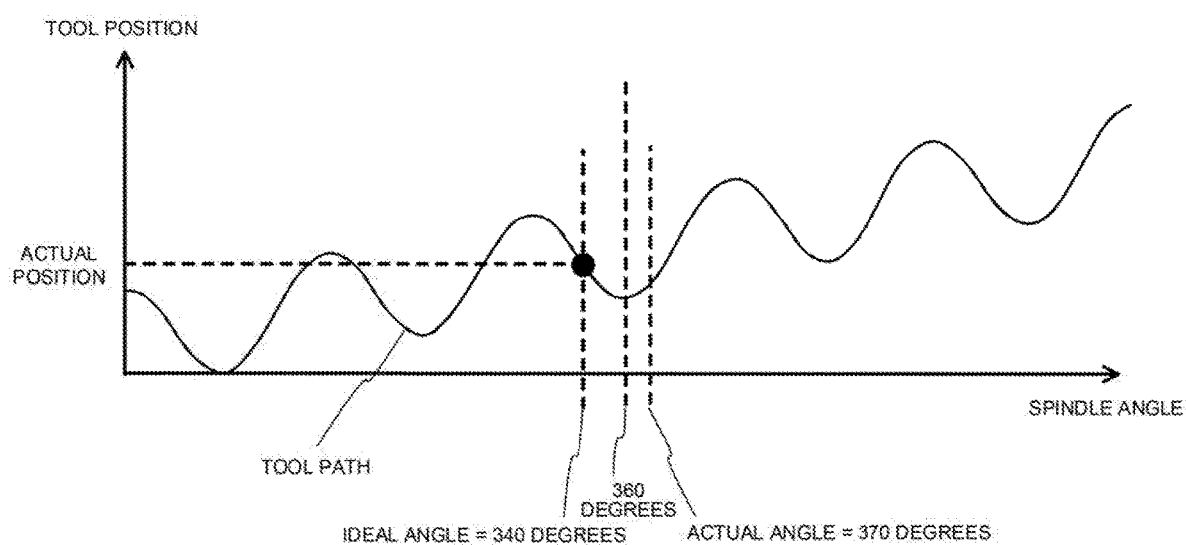
FIG. 4 is a view for explaining operations of a tracking error calculating unit and a frequency recalculating unit.

An operation of the numerical controller 100 will be described with reference to FIGS. 3 and 4. In this regard, the present embodiment will mainly describe processing different from conventional oscillation cutting, and will omit or simplify known processing as appropriate.

First, the position instruction generating unit 110 interprets the machining program and generates a position instruction. The oscillation instruction generating unit 120 generates an oscillation instruction. In this regard, the frequency calculating unit 121 and the amplitude calculating unit 122 determine an appropriate oscillation frequency and oscillation amplitude for shredding chips according to a known technique disclosed in, for example, Japanese Patent Application Laid-Open No. 2017-056515 A. The position speed control unit 130 adds the position instruction and the oscillation instruction to generate a synthesized instruction. The current control unit 140 controls the servo motor according to the synthesized instruction, and operates (feeds and oscillates) the tool.

The tracking error calculating unit 123 receives a position (angle) feedback from the spindle motor, and detects that a spindle rotates once (i.e., a rotation angle that is actual one (referred to as an actual angle below) is 360 degrees). Furthermore, the tracking error calculating unit 123 receives the position and speed feedbacks from the servo motor, and obtains a position that is actual one (referred to as an actual position) or a speed that is actual one (referred to as an actual speed) of the tool at a point of time when the spindle rotates once. Furthermore, the tracking error calculating unit 123 calculates an angle that is ideal one (referred to as an ideal angle) for the spindle matching the actual position or the actual speed of the tool.

This will be described with reference to FIG. 4. For example, it is assumed that an oscillation instruction is generated at I=2.5 (2.5 times of oscillation per rotation of spindle). At a point of time when the spindle rotates approximately once (actual angle=370 degrees), the actual position of the tool corresponding to a black point in FIG. 4 is obtained. A spindle angle corresponding to this actual position is calculated as 340 degrees in light of the synthesized instruction. This angle, 340 degrees, is the ideal angle. Thus, when there is a difference between the actual angle and the ideal angle, the tracking error occurs.

The frequency recalculating unit 124 recalculates the oscillation frequency based on the actual angle and the ideal angle of the spindle. For example, the oscillation frequency multiplying factor I is recalculated according to a following equation.

Recalculated oscillation frequency multiplying factor $I$=current oscillation frequency multiplying factor $I \times$(ideal angle/actual angle)

When, for example, the current oscillation frequency multiplying factor I is 2.5, the ideal angle is 340 degrees and the actual angle is 370 degrees, the recalculated oscillation frequency multiplying factor I is calculated as 2.5×340/370=2.297.

Alternatively, instead of adjusting the oscillation frequency multiplying factor I, the oscillation frequency multiplying factor I may be maintained, and a spindle rotational speed S may be adjusted. For example, the spindle rotational speed S is recalculated according to the following equation.

Recalculated spindle rotational speed $S$=current spindle rotational speed $S \times$(ideal angle/actual angle)

When, for example, the current spindle rotational speed S is 200, the ideal angle is 340 degrees and the actual angle is 370 degrees, the recalculated spindle rotational speed S is calculated as

200×340/370=183.78.

When adopting the recalculated frequency, the amplitude recalculating unit 125 recalculates such an amplitude that the tool path of first rotation and a tool path of second rotation overlap.

Figure 5:
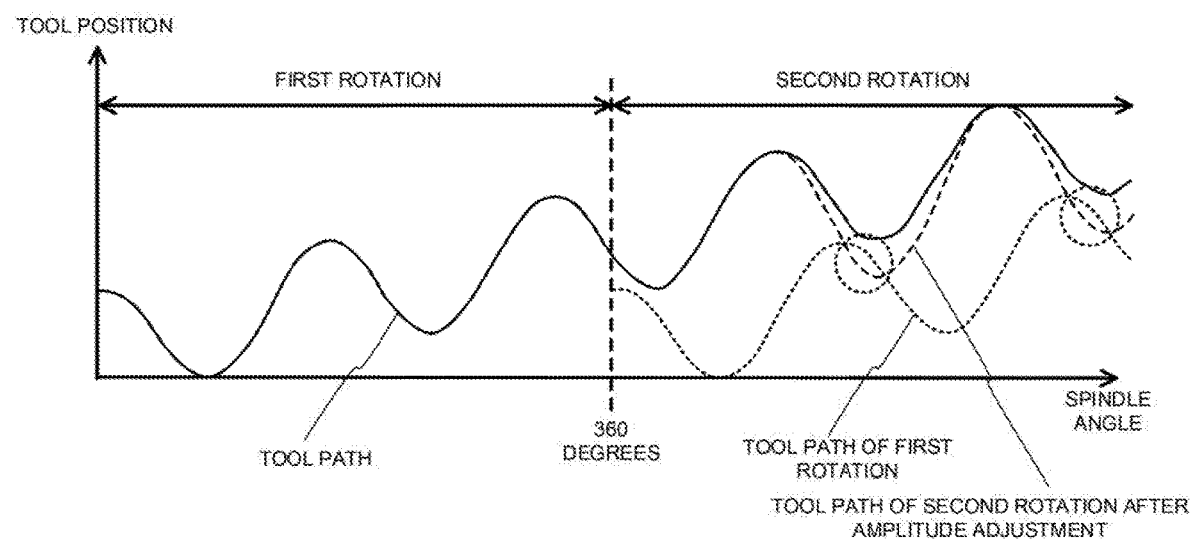
FIG. 5 is a view for explaining an operation of an amplitude recalculating unit.

Significance of recalculation of the amplitude will be described with reference to FIG. 5. A solid line in FIG. 5 indicates a tool path having a frequency after recalculation. The tool path of the first rotation and the tool path of the second rotation that no longer overlap due to the tracking error come close to some degree thanks to frequency recalculation processing, yet do not overlap. In this case, when the amplitude calculating unit 122 adjusts the amplitude as illustrated in, for example, FIG. 5, it is possible to overlap the tool path of the first rotation and the tool path of the second rotation (indicated by a broken line circle in FIG. 5).

In addition, only the frequency recalculation processing performed by the frequency recalculating unit 124 overlaps the tool path of the first rotation and the tool path of the second rotation. When, for example, the oscillation amplitude is high to some degree from beginning, it is sufficient to adjust only the frequency. In this case, the amplitude recalculating unit 125 does not need to recalculate the amplitude.

The amplitude recalculating unit 125 recalculates an oscillation amplitude multiplying factor K according to, for example, the following procedure. The amplitude recalculating unit 125 stores tool paths of two rotations of the spindle in a buffer at all times. The amplitude recalculating unit 125 determines whether or not a curve indicated by the tool path of the first rotation and a curve indicated by the tool path of the second rotation have an intersection point. When there is the intersection point, the previous oscillation amplitude multiplying factor K is continuously used without recalculating the oscillation amplitude multiplying factor K. When there is not the intersection point, the curve indicating the tool path of the second rotation is corrected to increase the current oscillation amplitude multiplying factor K (by, for example, multiplying the current oscillation amplitude multiplying factor K with a multiplying factor larger than predetermined 1) to obtain the recalculated oscillation amplitude multiplying factor K. Thus, the oscillation amplitude is corrected to increase. For the recalculated oscillation amplitude multiplying factor K, too, the amplitude recalculating unit 125 repeatedly executes processing subsequent to the above determination processing until there is the intersection point.

In addition, it is determined by the first determination processing that there is the intersection point, the current oscillation amplitude multiplying factor K may be corrected to decrease (by, for example, multiplying the current oscillation amplitude multiplying factor K with a multiplying factor smaller than predetermined 1). Furthermore, by repeatedly executing correction and determination processing, the minimum oscillation amplitude multiplying factor K having the intersection point is obtained. Generally, when an amplitude is higher, a load of a servo motor is greater. Consequently, by using the minimum oscillation amplitude multiplying factor K having the intersection point, it is possible to minimize the load of the servo motor.

The position speed control unit 130 adds the oscillation instruction including the recalculated oscillation frequency and oscillation amplitude to the position instruction to generate the synthesized instruction. The current control unit 140 controls the servo motor according to the synthesized instruction.

In addition, when the frequency recalculating unit 124 adjusts the spindle rotational speed S instead of the frequency multiplying factor I, the position speed control unit 130 adds the oscillation instruction including the recalculated oscillation amplitude to the position instruction to generate the synthesized instruction. The current control unit 140 controls the servo motor according to the synthesized instruction. In addition, the current control unit 140 controls the spindle motor according to the recalculated spindle rotational speed S.

According to the present embodiment, the tracking error calculating unit 123 of the oscillation instruction generating unit 120 calculates the actual angle and the ideal angle of the spindle, and the frequency recalculating unit 124 and the amplitude recalculating unit 125 recalculate the frequency and the amplitude. Consequently, even when the spindle rotational speed fluctuates and the tracking error occurs, the tool path of the first rotation and the tool path of the second rotation are automatically adjusted to overlap again, and chip shredding capability is maintained without requiring tuning performed by a user.

First Embodiment

The first embodiment will describe a characteristic operation of a numerical controller 100 in a case where a spindle override is changed.

Figure 6:
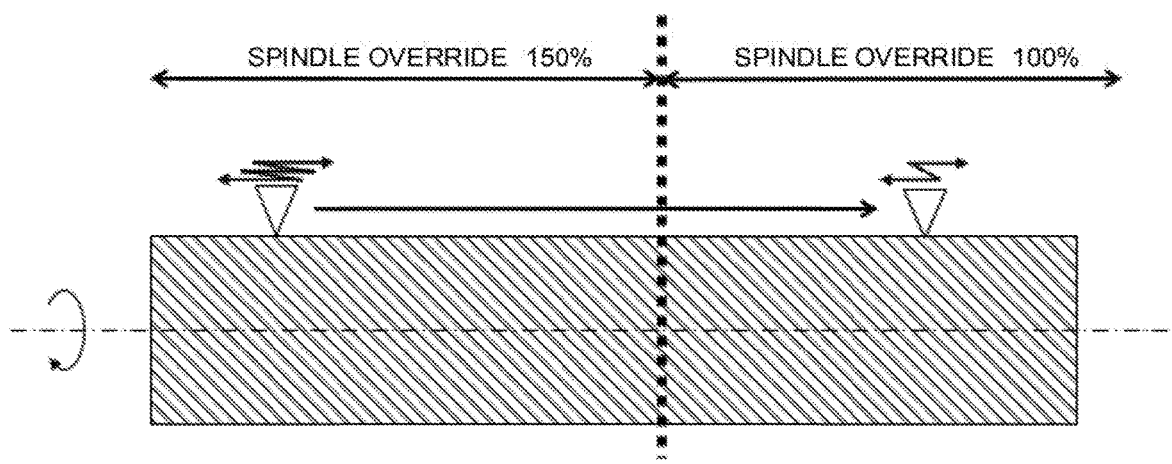
FIG. 6 is a view for explaining an operation according to a first embodiment.

A case where the spindle override is changed from 150% to 100% at a point of time as illustrated in, for example, FIG. 6 will be described. When the spindle override is changed to decrease, an oscillating operation becomes faster than rotation of a spindle immediately after the change, and therefore chips cannot be cut well in some cases. In this case, when a tracking error calculating unit 123 of a frequency calculating unit 121 detects a tracking error, a frequency recalculating unit 124 performs processing of recalculating an oscillation frequency multiplying factor I, and correcting the oscillation frequency multiplying factor I to decrease. In addition, according to the present embodiment, a spindle rotational speed is defined by an override, and therefore processing of adjusting a spindle rotational speed S is inappropriate. Subsequently, an amplitude recalculating unit 125 recalculates an oscillation amplitude multiplying factor K as need arises.

As described above, according to the present embodiment, the oscillation frequency also lowers following a decrease in the spindle rotational speed, so that chip shredding capability is maintained.

Second Embodiment

The second embodiment will describe a characteristic operation of a numerical controller 100 in a case where circumferential speed constant control and oscillation cutting are simultaneously performed.

Figure 7:
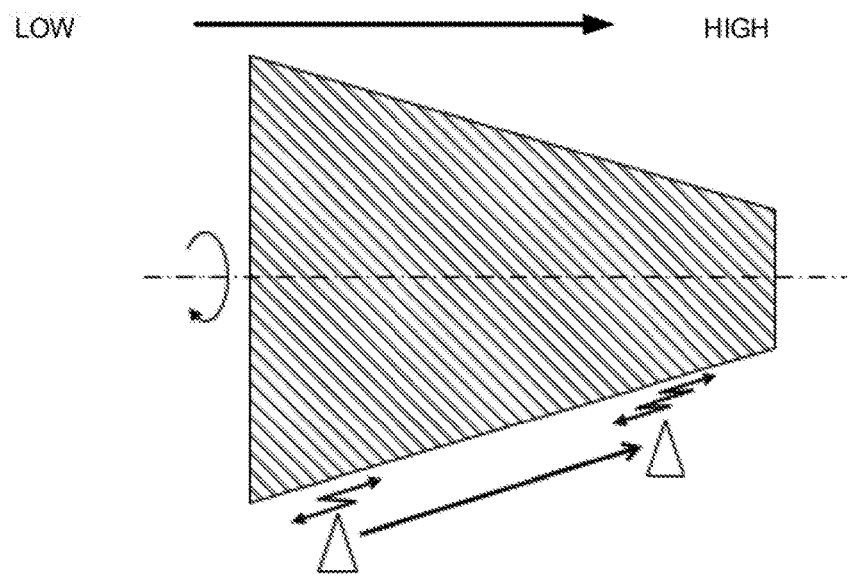
FIG. 7 is a view for explaining an operation according to a second embodiment.

As illustrated in, for example, FIG. 7, the circumferential speed constant control is carried out to perform tapering. The circumferential speed constant control is control for adjusting a spindle rotational speed to keep a constant cutting amount per unit time. By, for example, turning the spindle faster when the diameter of a workpiece is smaller, it is possible to keep a constant machining distance of a tool per unit time. When the spindle rotational speed is changed by the circumferential speed constant control to gradually increase, an oscillating operation cannot track rotation of the spindle, and chips cannot be cut well in some cases. In this case, when a tracking error calculating unit 123 of a frequency calculating unit 121 detects a tracking error, a frequency recalculating unit 124 performs processing of recalculating an oscillation frequency multiplying factor I, and correcting the oscillation frequency multiplying factor I to increase. In addition, according to the present embodiment, a spindle rotational speed is defined by the circumferential speed constant control, and therefore processing of a spindle rotational speed S is inappropriate. Subsequently, an amplitude recalculating unit 125 recalculates an oscillation amplitude multiplying factor K as need arises.

As described above, according to the present embodiment, the oscillation frequency also rises following an increase in the spindle rotational speed, so that chip shredding capability is maintained.

The embodiments according to the present invention have been described above. However, the present invention is not limited only to examples of the above embodiments and can be carried out in various modes by adding optional changes.

For example, the above embodiments have described the examples where, when a tracking error occurs, the frequency recalculating unit 124 first recalculates the oscillation frequency, and then the amplitude recalculating unit 125 recalculates the oscillation amplitude.

However, the present invention is not limited to this, and an adjustment order of the oscillation frequency and the oscillation amplitude is any order. For example, the amplitude recalculating unit 125 may first recalculate the oscillation amplitude, and then the frequency recalculating unit 124 may recalculate the oscillation frequency. In this case, if a tool path of first rotation and a tool path of second rotation can be overlapped only by adjusting the oscillation amplitude, the oscillation frequency does not necessarily need to be adjusted.

The embodiments of the present invention have been described above. However, the present invention is not limited to the examples of the above embodiments and can be carried out in various modes by adding optional changes.

The invention claimed is:

1. A numerical controller configured to perform oscillation cutting by superimposing an oscillation instruction on a position instruction, the oscillation instruction including specifying an oscillation frequency and an oscillation amplitude, the numerical controller comprising:
   a position instruction generating unit configured to generate the position instruction;
   an oscillation instruction generating unit configured to generate the oscillation instruction;
   a position speed control unit configured to add the position instruction and the oscillation instruction to generate a synthesized instruction; and
   a current control unit configured to control movement of a tool or rotation of a spindle,
   wherein the oscillation instruction generating unit includes:
      a tracking error calculating unit configured to obtain and calculate an actual angle and an ideal angle of the spindle, and
      a frequency recalculating unit configured to recalculate the oscillation frequency as a multiple of a ratio of the ideal angle divided by the actual angle,
   the oscillation instruction generating unit regenerates an oscillation instruction based on the recalculated oscillation frequency,
   the position speed control unit adds the position instruction and the regenerated oscillation instruction to regenerate a synthesized instruction, and
   the current control unit controls the movement of the tool or the rotation of the spindle according to the regenerated synthesized instruction.

2. The numerical controller according to claim 1, wherein the oscillation instruction generating unit further includes an amplitude recalculating unit configured to recalculate the oscillation amplitude such that tool paths overlap, and
the current control unit further controls the movement of the tool according to the recalculated oscillation amplitude.

* * * * *